Sept. 29, 1925.  
E. W. P. SMITH  
1,555,166  
ELECTRIC WELDING MECHANISM  
Filed Feb. 28, 1924
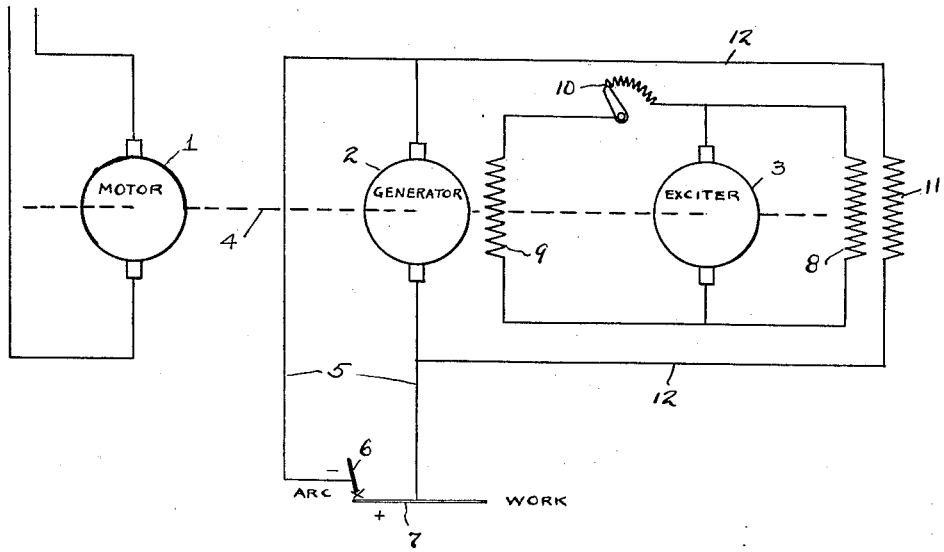
INVENTOR.  
Edward W. P. Smith  
BY  
Fay, Oberlin & Fay  
ATTORNEYS Patented Sept. 29, 1925.

1,555,166

UNITED STATES PATENT OFFICE.

EDWARD W. P. SMITH, OF CLEVELAND HEIGHTS, OHIO, ASSIGNOR TO THE LINCOLN ELECTRIC COMPANY, OF CLEVELAND, OHIO, A CORPORATION OF OHIO.

ELECTRIC WELDING MECHANISM.

Application filed February 28, 1924. Serial No. 695,657.

*To all whom it may concern:*

Be it known that I, EDWARD W. P. SMITH, a citizen of the United States, and a resident of Cleveland Heights, county of Cuyahoga, and State of Ohio, have invented a new and useful Improvement in Electric Welding Mechanisms, of which the following is a specification, the principle of the invention being herein explained and the best mode in which I have contemplated applying that principle, so as to distinguish it from other inventions.

In arc welding, and particularly where a carbon electrode is employed, the polarity of the work must be positive to get the best results. It has accordingly been recognized that in welding mechanism, means should be provided whereby accidental reversal of generator polarity is prevented. The present improvements are directed more particularly to welding mechanism wherein a shunt wound exciter is employed in connection with the generator, although the invention is not to be understood as limited to this particular field of use. In such case, i. e. where a shunt wound exciter is utilized, the lifting of the exciter brush because of high mica, or the chattering of the brush due to eccentricity of the commutator or other mechanical causes, will permit the main field of the generator or welder to discharge through the exciter field, thereby causing a reversal of the exciter field flux, and as a result, when the brush is replaced, the exciter builds up in the opposite direction from the original polarity. The voltmeter needle, in other words, will thereupon read backwards, and, as previously stated, the operation of the welder becomes unsatisfactory because of the reversal in polarity. Such reversal is particularly apt to occur when the welder is operating under very light loads, i. e., when the main welder field is at a minimum.

One principal object of the present invention, accordingly, is to correct the foregoing difficulty by providing a suitable arrangement of properly connected and proportioned fields for the exciter, so that disarrangement of the circuits, such for example as might be caused by lifting of the exciter brush, whereby a discharge of the main welder field through the exciter field would occur, will not cause a reversal of the generator voltage, although such voltage may be reduced. Instead, such discharge is counteracted by means of a separate field wherein the voltage is maintained in the proper direction at all times. Such separate field may also function in the normal operation of the welder to boost the voltage when working under open circuit conditions.

To the accomplishment of the foregoing and related ends, the invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

The single figure there appearing is a diagrammatic representation of an arc welder mechanism wherein my present improvements are incorporated.

In such mechanism, as will be understood, the motor 1 for driving the generator 2, as well as the exciter 3 for exciting the generator fields, are all mounted on the same shaft 4, or equivalent aligned shafts coupled together so as to constitute in effect a single shaft. The welding circuit 5, which is supplied with current of desired voltage and amperage by generator 2, is shown as including an electrode or welding pencil 6 between which and the work 7 an arc is struck when the mechanism is in operation. As previously stated and as indicated by the drawing, the work should be positive and the electrode negative. The usual control elements (not shown) will of course be included in such welding circuit 5.

The exciter 3, as explained above, is a shunt wound machine, i. e. it has an exciter shunt 8 and is connected to supply current to the welder shunt field 9 in which latter circuit is included a field rheostat 10.

The improvement which I have now made consists specifically in the provision of an auxiliary shunt field 11 for said exciter, this field being in a circuit 12 connected with the armature of the welder or generator 2 so as to be excited therefrom. This auxiliary or armature shunt 11 is so connected that it and the exciter shunt 8 will both be in the same direction in so far as the direction of the fields due to said windings are concerned.

If, then, said windings or shunts be properly proportioned, any disarrangement of the circuits that might cause a discharge of the main welder field 9 through the exciter field 8 will be counteracted so as to prevent a reversal of the exciter field, even though a reduction of welder voltage may occur. The windings should furthermore be proportioned so that the auxiliary or welder armature shunt 11 will not be of such a high value that when the welder is operating at high voltages, it will interfere with the operation of the welder. In fact, there may be some advantage in having this field boost the open circuit voltage when the welding operation is being started.

Proper proportioning means that the fields 8 and 11 are so related to each other and to field 9 that said field 11 prevents a reversal of the welder voltage, which voltage is due to field 9, because the time constants of these various fields are of such a value, relatively, that discharge of field 9 through field 8 is retarded an extent sufficient to prevent reversal of the exciter voltage. The collapse of the field through winding 9, whatever the occasion, causes the voltage from the generator 2 to be maintained or has a tendency to maintain such voltage in the same direction as when the welder is operating under normal conditions. On the contrary, the voltage generated by field 9 and discharged through coil 8 has a tendency to reverse field winding 8. However, the voltage generated through the generator armature upon collapse of field 9 maintains field 11 for a period of time after the total collapse of the field through winding 9, with the result that the voltage of the generator does not reach the zero value at any time.

The determination of the proper ratio of ampere turns in field 11 to those in field 8 and field 9, so as to give the proper lag in time, may be arrived at by calculation of the transient phenomena or ordinarily more readily by empirical tests.

As previously indicated, the ampere turns of the auxiliary field 11 should not be of such a high value that when the welder is operating at high voltages, it will cause an abnormally high voltage across the welder terminals. In other words, the normal operation of a 200 ampere welder gives an open circuit voltage of approximately 85 volts, while with this auxiliary or welder armature shunt included in the manner described, the voltage given by the welder on open circuit should be approximately 90 volts.

It should be explained, in conclusion, that while I have shown and described my invention in connection with an arc-welding mechanism, and particularly one in which a shunt wound exciter for the generator is employed, such invention may be applied to any separately excited generator, whatever the special use for which the latter may be designed. Thus such improvement may be used to advantage in connection with a compound wound exciter for any separately excited direct-current generator.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a dynamo-electric machine, the combination with a generator and its circuit for delivering current; of an exciter for said generator; a main shunt winding for said exciter; and an auxiliary winding for said exciter, said auxiliary winding being excited from the armature of said generator, and the direction of the field of said auxiliary winding being the same as that of the main shunt winding of said exciter.

2. In a dynamo-electric machine; the combination with a generator and its circuit for delivering current; of an exciter for said generator, said exciter having two field-windings, one self excited and the other excited from the armature of said generator, the direction of the field of both windings being the same.

3. In a dynamo-electric machine, the combination with a generator and its circuit for delivering current; of an exciter for said generator, said exciter having two field-windings, one self-excited and the other excited from the armature of said generator, the direction of the fields of both windings being the same and the second winding being so arranged and proportioned as to prevent a reversal of the exciter field, substantially as described.

4. In a dynamo-electric machine, the combination with a generator and its circuit for delivering current; of an exciter for said generator, said exciter having two field-windings, one self-excited and the other excited from the armature of said generator, the direction of the fields of both windings being the same and the second winding being so arranged and proportioned as to counteract a reversal of the exciter field.

5. In arc welding mechanism, the combination with a generator and its circuit for delivering welding current, of an exciter for said generator, a main shunt winding for said exciter; and an auxiliary winding for said exciter, said auxiliary winding being excited from the armature of said generator and having the direction of its field the same as that of the shunt winding of said exciter.

6. In arc welding mechanism, the combination with a generator and its circuit for delivering welding current; of a shunt wound exciter for said generator; and an auxiliary shunt winding for said exciter, said auxiliary shunt winding being excited from the armature of said generator and the direction of the field of said auxiliary shunt winding being the same as that of the main shunt winding of said exciter.

7. In arc welding mechanism, the combination with a generator and its circuit for delivering welding current; of an exciter for said generator, said exciter having two field-windings, one self-excited and the other excited from the armature of said generator, the direction of the fields of both windings being the same and the second winding being so arranged and proportioned as to prevent a reversal of the exciter field, substantially as described.

8. In arc welding mechanism, the combination with a generator and its circuit for delivering welding current; of an exciter for said generator, said exciter having two field-windings, one self-excited and the other excited from the armature of said generator, the direction of the fields of both windings being the same and the second winding being so arranged and proportioned as to counteract a reversal of the exciter field.

9. In arc welding mechanism, the combination with a generator and its circuit for delivering welding current; of an exciter for said generator, said exciter having two field-windings, one self-excited and the other excited from the armature of said generator, the direction of the fields of both windings being the same and the second winding being so arranged and proportioned as to counteract a reversal of the exciter field and at the same time avoid causing an abnormally high voltage across the generator terminals.

Signed by me this 25th day of February, 1924.

EDWARD W. P. SMITH.